US008455560B2

(12) United States Patent
Dietrich et al.

(10) Patent No.: US 8,455,560 B2
(45) Date of Patent: Jun. 4, 2013

(54) FOAM LAYER PRODUCED OF A BIODEGRADABLE POLYESTER MIXTURE

(75) Inventors: Björn Dietrich, Heidelberg (DE); Daniela Longo-Schedel, Sankt Augustin (DE); Gabriel Skupin, Speyer (DE); Florian Krückl, Hockenheim (DE)

(73) Assignee: BASF SE, Ludwigshafen (DE)

( * ) Notice: Subject to any disclaimer, the term of this patent is extended or adjusted under 35 U.S.C. 154(b) by 663 days.

(21) Appl. No.: 12/526,807

(22) PCT Filed: Feb. 11, 2008

(86) PCT No.: PCT/EP2008/051591
§ 371 (c)(1),
(2), (4) Date: Jun. 11, 2010

(87) PCT Pub. No.: WO2008/098888
PCT Pub. Date: Aug. 21, 2008

(65) Prior Publication Data
US 2010/0239834 A1 Sep. 23, 2010

(30) Foreign Application Priority Data

Feb. 15, 2007 (EP) .................................. 07102477

(51) Int. Cl.
*C08J 9/00* (2006.01)
*C08J 9/12* (2006.01)
*C08J 9/14* (2006.01)
*C08K 3/20* (2006.01)

(52) U.S. Cl.
CPC *C08J 9/0061* (2013.01); *C08J 9/00* (2013.01); *C08J 9/0023* (2013.01); *C08J 9/122* (2013.01); *C08K 3/20* (2013.01)
USPC .................. 521/97; 521/59; 521/60; 521/79

(58) Field of Classification Search
CPC ... C08J 9/0061; C08J 9/0023; C08J 9/00; C08J 9/122; C08K 3/10
USPC .................. 521/59, 79; 523/124; 524/436; 52/60, 97
See application file for complete search history.

(56) References Cited

U.S. PATENT DOCUMENTS

| | | | |
|---|---|---|---|
| 5,817,721 A | 10/1998 | Warzelhan et al. | |
| 5,863,991 A | 1/1999 | Warzelhan et al. | |
| 5,880,220 A | 3/1999 | Warzelhan et al. | |
| 5,883,199 A | 3/1999 | McCarthy et al. | |
| 5,889,135 A | 3/1999 | Warzelhan et al. | |
| 5,936,045 A | 8/1999 | Warzelhan et al. | |
| 6,018,004 A | 1/2000 | Warzelhan et al. | |
| 6,111,058 A | 8/2000 | Warzelhan et al. | |
| 6,114,042 A | 9/2000 | Warzelhan et al. | |
| 6,120,895 A | 9/2000 | Kowitz et al. | |
| 6,201,034 B1 | 3/2001 | Warzelhan et al. | |
| 6,258,924 B1 | 7/2001 | Warzelhan et al. | |
| 6,353,084 B1 | 3/2002 | Warzelhan et al. | |
| 2005/0154114 A1* | 7/2005 | Hale | 524/436 |
| 2008/0281018 A1 | 11/2008 | Seeliger et al. | |
| 2008/0312379 A1 | 12/2008 | Scherzer et al. | |
| 2010/0025877 A1 | 2/2010 | Moreira et al. | |

FOREIGN PATENT DOCUMENTS

| | | |
|---|---|---|
| EP | 0792309 B1 | 9/2002 |
| JP | 2003020355 A * | 1/2003 |
| JP | 2004067894 A | 3/2004 |
| JP | 2005179537 A | 7/2005 |
| WO | WO-92/09654 A2 | 6/1992 |
| WO | WO-96/15173 A1 | 5/1996 |
| WO | WO-96/15174 A1 | 5/1996 |
| WO | WO-96/15175 A1 | 5/1996 |
| WO | WO-96/15176 A1 | 5/1996 |
| WO | WO-96/21689 | 7/1996 |
| WO | WO-96/21690 A1 | 7/1996 |
| WO | WO-96/21691 A1 | 7/1996 |
| WO | WO-96/21692 A1 | 7/1996 |
| WO | WO-96/25446 A1 | 8/1996 |
| WO | WO-96/25448 A1 | 8/1996 |
| WO | WO-98/12242 A1 | 3/1998 |
| WO | WO-99/65977 A1 | 12/1999 |
| WO | WO-2006/074815 A1 | 7/2006 |
| WO | WO-2006/087346 A1 | 8/2006 |
| WO | WO-2007/042455 A1 | 4/2007 |
| WO | WO-2008/003623 A1 | 1/2008 |
| WO | WO-2008/098889 A1 | 8/2008 |

* cited by examiner

*Primary Examiner* — Randy Gulakowski
*Assistant Examiner* — Kara Boyle
(74) *Attorney, Agent, or Firm* — Novak Druce Connolly Bove + Quigg LLP

(57) ABSTRACT

The invention relates to a foam ply based on a biodegradable polyester mixture, comprising i) from 70 to 5% by weight, based on the total weight of components i to ii, of at least one polyester based on aliphatic and aromatic dicarboxylic acids and on aliphatic dihydroxy compounds, and ii) from 30 to 95% by weight, based on the total weight of components i to ii, of poly-lactide, and iii) from 0.1 to 5% by weight, based on the total weight of components i to ii, of a copolymer which comprises epoxy groups and is based on styrene, acrylates, and/or methacrylates, and iv) from 0.5 to 15% by weight of additives; and v) from 0 to 50% by weight of inorganic or organic filler, and also to processes for production of the foam ply mentioned, and to the use of the foam plies for the production of moldings and foils, and also to moldings and foils comprising the foam plies mentioned.

12 Claims, No Drawings

FOAM LAYER PRODUCED OF A BIODEGRADABLE POLYESTER MIXTURE

RELATED APPLICATIONS

This application is a national stage application (under 35 U.S.C. §371) of PCT/EP2008/051591, filed Feb. 11, 2008, which claims benefit of European Application No. 07102477.2, filed Feb. 15, 2007.

The present invention relates to foam plies based on a biodegradable polyester mixture, comprising
i) from 70 to 5% by weight, based on the total weight of components i to ii, of at least one polyester based on aliphatic and aromatic dicarboxylic acids and on aliphatic dihydroxy compounds,
ii) from 30 to 95% by weight, based on the total weight of components i to ii, of polylactide (PLA), and
iii) from 0.1 to 5% by weight, based on the total weight of components i to ii, of a copolymer which comprises epoxy groups and is based on styrene, acrylates, and/or methacrylates, and
iv) from 0 to 15% of additives such as nucleating agents, lubricants and antiblocking agents, waxes, antistatic agents, antifog agents, or dyes; and
v) from 0 to 50% of inorganic or organic fillers.

The present invention also relates to processes for production of the foam plies mentioned, and to the use of the foam plies for the production of moldings and foils, and also to moldings and foils comprising the foam plies mentioned.

Biodegradable polyester mixtures with similar constitution of components i) to v) have been previously described in WO 2006/074815. However, there is no mention of the production of foam plies.

JP 2004-067894 describes polyester mixtures based on polylactide and on biodegradable, aliphatic/aromatic polyesters. A mixture composed of low-molecular-weight acrylates and in particular of peroxides is used as crosslinking agent. Although the authors mention that the polyester mixtures can be foamed, no foam plies are produced. Nor is anything said about the chemical and physical properties of the foams.

JP 2005-179537 discloses polyester mixtures with high polylactide content and with aliphatic/aromatic polyesters based on polyethylene terephthalate, these being capable of only slow biodegradation. Prior to the foaming process, no crosslinking agent or compatibilizer is added to the mixtures. No foam plies are described.

WO 99/065977 produces foam sheets based on biodegradable, aliphatic/aromatic polyesters and cellulose acetate by means of direct injection of carbon dioxide gas. The foils have high density, greater than 200 to 600 g/l.

The polyester mixtures known from the prior art have only limited suitability for production of foam plies. In particular, it has hitherto not been possible to produce foam plies of low density, in particular smaller than 50 g/l. It would also be desirable to provide foam plies with high content (greater than 70%) of closed cells, since these have better thermal insulation behavior than open-cell foams. Finally, it is an object of the present invention to develop foam plies composed of biodegradable polymers—preferably composed of renewable raw materials, permitting production without blowing agents, such as hydrocarbon or fluorinated hydrocarbons. An advantage of using inert blowing agents, such as nitrogen and in particular carbon dioxide, alongside environmental factors, is that the resultant foam plies have approval for the food sector.

An object underlying the present invention is therefore to provide foam plies which are composed of biodegradable materials and do not have the above-mentioned disadvantages.

Surprisingly, it has now been found that polyester mixtures comprising
i) from 70 to 5% by weight, based on the total weight of components i to ii, of at least one polyester based on aliphatic and aromatic dicarboxylic acids and on aliphatic dihydroxy compounds,
ii) from 30 to 95% by weight, based on the total weight of components i to ii, of polylactide (PLA), and
iii) from 0.1 to 5% by weight, based on the total weight of components i to ii, of a copolymer which comprises epoxy groups and is based on styrene, acrylates, and/or methacrylates, and
iv) from 0 to 15% of additives such as nucleating agents, lubricants and antiblocking agents, waxes, antistatic agents, antifog agents, or dyes; and
v) from 0 to 50% of inorganic or organic fillers, such as polymers composed of renewable raw materials, e.g.: starch, cellulose, cereals, polyhydroxyalkanoates, or polycaprolactone, or aliphatic polyesters,
can be processed with blowing agents, such as carbon dioxide or nitrogen, to give foam plies with low density and with high content of closed cells.

The inventive foam plies differ from those of the prior art in particular via the polyester mixtures used, in particular via the compatibilizer (component iii).

In principle, any of the polyesters based on aliphatic and aromatic dicarboxylic acids and on aliphatic dihydroxy compounds, known as semiaromatic polyesters, may be used as component i for preparation of the inventive biodegradable polyester mixtures. Mixtures of two or more of these polyesters are of course also suitable as component i.

According to the invention, the term semiaromatic polyesters is also intended to include polyester derivatives, such as polyetheresters, polyesteramides, or polyetheresteramides. Among the suitable semiaromatic polyesters are linear non-chain-extended polyesters (WO 92/09654). Preference is given to chain-extended and/or branched semiaromatic polyesters. The latter are disclosed in the specifications mentioned at the outset, WO 96/15173-15176, 21689-21692, 25446, 25448, and WO 98/12242, expressly incorporated herein by way of reference. Mixtures of different semiaromatic polyesters may also be used. In particular, the term semiaromatic polyesters is intended to mean products such as Ecoflex® (BASF Aktiengesellschaft) and Eastar® Bio and Origo-Bi (Novamont).

Among the particularly preferred semiaromatic polyesters are polyesters which comprise the following significant components
A) an acid component composed of
a1) from 30 to 99 mol % of at least one aliphatic, or at least one cycloaliphatic, dicarboxylic acid, or its ester-forming derivatives, or a mixture of these
a2) from 1 to 70 mol % of at least one aromatic dicarboxylic acid, or its ester-forming derivative, or a mixture of these, and
a3) from 0 to 5 mmol % of a compound comprising sulfonate groups,
B) a diol component selected from at least one $C_2$-$C_{12}$ alkanediol and at least one $C_5$-$C_{10}$ cycloalkanediol, or a mixture of these,
and, if desired, also one or more components selected from C) a component selected from
  c1) at least one dihydroxy compound comprising ether functions and having the formula I

  HO—[(CH$_2$)$_n$—O]$_m$—H    (I)

where n is 2, 3 or 4 and m is a whole number from 2 to 250, c2) at least one hydroxycarboxylic acid of the formula IIa or IIb

  HO—[C(O)-G-O]$_p$—H    (IIa)

  [C(O)-G-O]$_r$    (IIb)

where p is a whole number from 1 to 1500 and r is a whole number from 1 to 4, and G is a radical selected from the group consisting of phenylene, —(CH$_2$)$_q$—, where q is a whole number from 1 to 5, —C(R)H— and —C(R)HCH$_2$, where R is methyl or ethyl, c3) at least one amino-C$_2$-C$_{12}$ alkanol, or at least one amino-C$_5$-C$_{10}$ cycloalkanol, or a mixture of these,
  c4) at least one diamino-C$_1$-C$_8$ alkane,
  c5) at least one 2,2'-bisoxazoline of the formula III

  (III)

where R$^1$ is a single bond, a (CH$_2$)$_z$-alkylene group, where z=2, 3 or 4, or a phenylene group, c6) at least one aminocarboxylic acid selected from the group consisting of the naturally occurring amino acids, polyamides obtainable by polycondensing a dicarboxylic acid having from 4 to 6 carbon atoms with a diamine having from 4 to 10 carbon atoms, compounds of the formulae IVa and IVb

  HO—[C(O)-T-N(H)]$_s$—H    (IVa)

  [C(O)-T-N(H)]$_t$    (IVb)

where s is a whole number from 1 to 1500 and t is a whole number from 1 to 4, and T is a radical selected from the group consisting of phenylene, —(CH$_2$)$_u$—, where u is a whole number from 1 to 12, —C(R$^2$)H— and —C(R$^2$)HCH$_2$—, where R$^2$ is methyl or ethyl, and polyoxazolines having the repeat unit V

  (V)

where R$^3$ is hydrogen, C$_1$-C$_6$-alkyl, C$_5$-C$_8$-cycloalkyl, phenyl, either unsubstituted or with up to three C$_1$-C$_4$-alkyl substituents, or tetrahydrofuryl,
  or a mixture composed of c1 to c6,
and of
D) a component selected from
  d1) at least one compound having at least three groups capable of ester formation,
  d2) at least one isocyanate,
  d3) at least one divinyl ether,
  or a mixture composed of d1) to d3).

In one preferred embodiment, the acid component A of the semiaromatic polyesters comprises from 30 to 70 mol %, in particular from 40 to 60 mol %, of a1, and from 30 to 70 mol %, in particular from 40 to 60 mol %, of a2.

Aliphatic acids and the corresponding derivatives a1 which may be used are generally those having from 2 to 10 carbon atoms, preferably from 4 to 6 carbon atoms. They may be either linear or branched. The cycloaliphatic dicarboxylic acids which may be used for the purposes of the present invention are generally those having from 7 to 10 carbon atoms and in particular those having 8 carbon atoms. In principle, however, it is also possible to use dicarboxylic acids having a larger number of carbon atoms, for example having up to 30 carbon atoms.

Examples which may be mentioned are: malonic acid, succinic acid, glutaric acid, 2-methylglutaric acid, 3-methylglutaric acid, adipic acid, pimelic acid, azelaic acid, sebacic acid, fumaric acid, 2,2-dimethylglutaric acid, suberic acid, 1,3-cyclopentane-dicarboxylic acid, 1,4-cyclohexanedicarboxylic acid, 1,3-cyclohexanedicarboxylic acid, diglycolic acid, itaconic acid, maleic acid, brassylic acid, and 2,5-norbornanedicarboxylic acid.

Ester-forming derivatives of the abovementioned aliphatic or cycloaliphatic dicarboxylic acids which may also be used and which may be mentioned are in particular the di-C$_1$-C$_6$-alkyl esters, such as dimethyl, diethyl, di-n-propyl, diisopropyl, di-n-butyl, diisobutyl, di-tert-butyl, di-n-pentyl, diisopentyl or di-n-hexyl esters. It is also possible to use anhydrides of the dicarboxylic acids.

The dicarboxylic acids or their ester-forming derivatives may be used here individually or in the form of a mixture composed of two or more of these.

It is preferable to use succinic acid, adipic acid, azelaic acid, sebacic acid, brassylic acid, or respective ester-forming derivatives thereof, or a mixture of these. It is particularly preferable to use succinic acid, adipic acid, or sebacic acid, or respective ester-forming derivatives thereof, or a mixture of these. It is particularly preferable to use adipic acid or its ester-forming derivatives, for example its alkyl esters, or a mixture thereof. The aliphatic dicarboxylic acid used preferably comprises sebacic acid or a mixture of sebacic acid with adipic acid, if polymer mixtures with "hard" or "brittle" components ii), for example polyhydroxybutyrate or in particular polylactide, are prepared. The aliphatic dicarboxylic acid used preferably comprises succinic acid or a mixture of succinic acid with adipic acid if polymer mixtures with "soft" or "tough" components ii), for example polyhydroxybutyrate-co-valerate, are prepared.

A further advantage of succinic acid, azelaic acid, sebacic acid, and brassylic acid is that they are accessible renewable raw materials.

Aromatic dicarboxylic acids a2 which may be mentioned are generally those having from 8 to 12 carbon atoms and preferably those having 8 carbon atoms. By way of example, mention may be made of terephthalic acid, isophthalic acid, 2,6-naphthoic acid and 1,5-naphthoic acid, and also ester-forming derivatives of these. Particular mention may be made here of the di-C$_1$-C$_6$-alkyl esters, e.g. dimethyl, diethyl, di-n-propyl, diisopropyl, di-n-butyl, diisobutyl, di-tert-butyl, di-n-pentyl, diisopentyl, or di-n-hexyl esters. The anhydrides of the dicarboxylic acids a2 are also suitable ester-forming derivatives.

However, in principle it is also possible to use aromatic dicarboxylic acids a2 having a greater number of carbon atoms, for example up to 20 carbon atoms.

The aromatic dicarboxylic acids or ester-forming derivatives of these a2 may be used individually or as a mixture of two or more of these. It is particularly preferable to use terephthalic acid or ester-forming derivatives thereof, such as dimethyl terephthalate.

The compound used comprising sulfonate groups is usually one of the alkali metal or alkaline earth metal salts of a sulfonate-containing dicarboxylic acid or ester-forming derivatives thereof, preferably alkali metal salts of 5-sulfoisophthalic acid or a mixture of these, particularly preferably the sodium salt.

In one of the preferred embodiments, the acid component A comprises from 40 to 60 mol % of a1, from 40 to 60 mol % of a2 and from 0 to 2 mol % of a3. In another preferred embodiment, the acid component A comprises from 40 to 59.9 mol % of a1, from 40 to 59.9 mol % of a2 and from 0.1 to 1 mol % of a3, in particular from 40 to 59.8 mol % of a1, from 40 to 59.8 mol % of a2 and from 0.2 to 0.5 mol % of a3.

The diols B are generally selected from the group consisting of branched or linear alkanediols having from 2 to 12 carbon atoms, preferably from 4 to 6 carbon atoms, or from the group consisting of cycloalkanediols having from 5 to 10 carbon atoms.

Examples of suitable alkanediols are ethylene glycol, 1,2-propanediol, 1,3-propanediol, 1,2-butanediol, 1,4-butanediol, 1,5-pentanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol and 2,2,4-trimethyl-1,6-hexanediol, in particular ethylene glycol, 1,3-propanediol, 1,4-butanediol or 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol or 2,2,4,4-tetramethyl-1,3-cyclobutanediol. Particular preference is given to 1,4-butanediol, in particular in combination with adipic acid as component a1), and 1,3-propanediol, in particular in combination with sebacic acid as component a1). Another advantage of 1,3-propanediol is that it is an available renewable raw material. It is also possible to use mixtures of different alkanediols.

Depending on whether an excess of acid groups or of OH end groups is desired, either component A or component B may be used in excess. In one preferred embodiment, the molar ratio of the components A and B used may be from 0.4:1 to 1.5:1, preferably from 0.6:1 to 1.1:1.

Besides components A and B, the polyesters on which the polyester mixtures of the invention are based may comprise other components.

Dihydroxy compounds c1 which are preferably used are diethylene glycol, triethylene glycol, polyethylene glycol, polypropylene glycol and polytetrahydrofuran (polyTHF), particularly preferably diethylene glycol, triethylene glycol and polyethylene glycol, and mixtures of these may also be used, as may compounds which have different variables n (see formula I), for example polyethylene glycol which comprises propylene units (n=3), obtainable, for example, by using methods of polymerization known per se and polymerizing first with ethylene oxide and then with propylene oxide, and particularly preferably a polymer based on polyethylene glycol with different variables n, where units formed from ethylene oxide predominate. The molar mass ($M_n$) of the polyethylene glycol is generally selected within the range from 250 to 8000 g/mol, preferably from 600 to 3000 g/mol.

In one of the preferred embodiments for preparing the semiaromatic polyesters use may be made, for example, of from 15 to 98 mol %, preferably from 60 to 99.5 mol %, of the diols B and from 0.2 to 85 mol %, preferably from 0.5 to 30 mol %, of the dihydroxy compounds c1, based on the molar amount of B and c1.

In one preferred embodiment, the hydroxycarboxylic acid c2) used is: glycolic acid, D-, L- or D,L-lactic acid, 6-hydroxyhexanoic acid, cyclic derivatives of these, such as glycolide (1,4-dioxane-2,5-dione), D- or L-dilactide (3,6-dimethyl-1,4-dioxane-2,5-dione), p-hydroxybenzoic acid, or else their oligomers and polymers, such as 3-polyhydroxybutyric acid, polyhydroxyvaleric acid, polylactide (obtainable, for example, as NatureWorks® 4042D (NatureWorks) or else a mixture of 3-polyhydroxybutyric acid and polyhydroxyvaleric acid (obtainable from PHB Industrial, Tianan, or Metabolix) and, for preparing semiaromatic polyesters, particularly preferably the low-molecular-weight and cyclic derivatives thereof.

Examples of amounts which may be used of the hydroxycarboxylic acids are from 0.01 to 50% by weight, preferably from 0.1 to 40% by weight, based on the amount of A and B.

The amino-$C_2$-$C_{12}$ alkanol or amino-$C_5$-$C_{10}$ cycloalkanol used (component c3) which for the purposes of the present invention also include 4-aminomethylcyclohexanemethanol, are preferably amino-$C_2$-$C_8$ alkanols, such as 2-aminoethanol, 3-aminopropanol, 4-aminobutanol, 5-aminopentanol or 6-aminohexanol, or else amino-$C_5$-$C_6$ cycloalkanols, such as aminocyclopentanol and aminocyclohexanol, or mixtures of these.

The diamino-$C_1$-$C_8$ alkanes (component c4) used are preferably diamino-$C_4$-$C_6$ alkanes, such as 1,4-diaminobutane, 1,5-diaminopentane or 1,6-diaminohexane (hexamethylenediamine, "HMD").

In one preferred embodiment for preparing the semiaromatic polyesters, use may be made of from 0.5 to 99.5 mol %, preferably from 0.5 to 50 mol %, of c3, based on the molar amount of B, and of from 0 to 50 mol %, preferably from 0 to 35 mol %, of c4, based on the molar amount of B.

The 2,2'-bisoxazolines c5 of the formula III are generally obtainable via the process of Angew. Chem. Int. Edit., Vol. 11 (1972), pp. 287-288. Particularly preferred bisoxazolines are those where $R^1$ is a single bond, $(CH_2)_z$-alkylene, where z=2, 3 or 4, for example methylene, ethane-1,2-diyl, propane-1,3-diyl or propane-1,2-diyl, or a phenylene group. Particularly preferred bisoxazolines which may be mentioned are 2,2'-bis(2-oxazoline), bis(2-oxazolinyl)methane, 1,2-bis(2-oxazolinyl)ethane, 1,3-bis(2-oxazolinyl)propane and 1,4-bis(2-oxazolinyl)butane, in particular 1,4-bis(2-oxazolinyl)benzene, 1,2-bis(2-oxazolinyl)benzene or 1,3-bis(2-oxazolinyl)benzene.

In preparing the semiaromatic polyesters use may, for example, be made of from 70 to 98 mol % of B, up to 30 mol % of c3 and from 0.5 to 30 mol % of c4 and from 0.5 to 30 mol % of c5, based in each case on the total of the molar amounts of components B, c3, c4 and c5. In another preferred embodiment, use may be made of from 0.1 to 5% by weight, preferably from 0.2 to 4% by weight, of c5, based on the total weight of A and B.

The component c6 used may be naturally occurring aminocarboxylic acids. These include valine, leucine, isoleucine, threonine, methionine, phenylalanine, tryptophan, lysine, alanine, arginine, aspartamic acid, cysteine, glutamic acid, glycine, histidine, proline, serine, tyrosine, asparagine and glutamine.

Preferred aminocarboxylic acids of the formulae IVa and IVb are those where s is a whole number from 1 to 1000 and t is a whole number from 1 to 4, preferably 1 or 2, and t has been selected from the group consisting of phenylene and —$(CH_2)_u$—, where u is 1, 5, or 12.

c6 may also be a polyoxazoline of the formula V. However, c6 may also be a mixture of different aminocarboxylic acids and/or polyoxazolines.

In one preferred embodiment, the amount of c6 used may be from 0.01 to 50% by weight, preferably from 0.1 to 40% by weight, based on the total amount of components A and B.

Among other components which may be used, if desired, for preparing the semiaromatic polyesters are compounds d1 which comprise at least three groups capable of ester formation.

The compounds d1 preferably comprise from three to ten functional groups which are capable of developing ester bonds. Particularly preferred compounds d1 have from three to six functional groups of this type in the molecule, in particular from three to six hydroxy groups and/or carboxy groups. Examples which should be mentioned are:
tartaric acid, citric acid, maleic acid;
trimethylolpropane, trimethylolethane;
pentaerythritol;
polyethertriols;
glycerol;
trimesic acid;
trimellitic acid, trimellitic anhydride;
pyromellitic acid, pyromellitic dianhydride, and
hydroxyisophthalic acid.

The amounts generally used of the compounds d1 are from 0.01 to 15 mol %, preferably from 0.05 to 10 mol %, particularly preferably from 0.1 to 4 mol %, based on component A.

Components d2 used are an isocyanate or a mixture of different isocyanates. Aromatic or aliphatic diisocyanates may be used. However, higher-functionality isocyanates may also be used.

For the purposes of the present invention, aromatic diisocyanate d2 is especially tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate or xylylene diisocyanate. By way of example, it is possible to use the isocyanates obtainable as Basonat® from BASF Aktiengesellschaft.

Among these, particular preference is given to diphenylmethane 2,2'-, 2,4'- and 4,4'-diisocyanate as component d2. The latter diisocyanates are generally used as a mixture.

A three-ring isocyanate d2 which may also be used is tri(4-isocyanophenyl)methane. Multi-ringed aromatic diisocyanates arise during the preparation of single- or two-ring diisocyanates, for example.

Component d2 may also comprise subordinate amounts, e.g. up to 5% by weight, based on the total weight of component d2, of uretdione groups, for example for capping the isocyanate groups.

For the purposes of the present invention, an aliphatic diisocyanate d2 is primarily a linear or branched alkylene diisocyanate or cycloalkylene diisocyanate having from 2 to 20 carbon atoms, preferably from 3 to 12 carbon atoms, e.g. hexamethylene 1,6-diisocyanate, isophorone diisocyanate, or methylenebis(4-isocyanatocyclohexane). Hexamethylene 1,6-diisocyanate and isophorone diisocyanate are particularly preferred aliphatic diisocyanates d2.

Among the preferred isocyanurates are the aliphatic isocyanurates which derive from $C_2$-$C_{20}$, preferably $C_3$-$C_{12}$, cycloalkylene diisocyanates or alkylene diisocyanates, e.g. isophorone diisocyanate or methylenebis(4-isocyanatocyclohexane). The alkylene diisocyanates here may be either linear or branched. Particular preference is given to isocyanurates based on n-hexamethylene diisocyanate, for example cyclic trimers, pentamers, or higher oligomers of n-hexamethylene diisocyanate.

The amounts generally used of component d2 are from 0.01 to 5 mol %, preferably from 0.05 to 4 mol %, particularly preferably from 0.1 to 4 mol %, based on the total of the molar amounts of A and B.

Divinyl ethers d3 which may be used are generally any of the customary and commercially available divinyl ethers. Preference is given to the use of 1,4-butanediol divinyl ethers, 1,6-hexanediol divinyl ethers or 1,4-cyclohexanedimethanol divinyl ethers or a mixture of these.

The amounts of the divinyl ethers preferably used are from 0.01 to 5% by weight, especially from 0.2 to 4% by weight, based on the total weight of A and B.

Examples of preferred semiaromatic polyesters are based on the following components
A, B, d1
A, B, d2
A, B, d1, d2
A, B, d3
A, B, c1
A, B, c1, d3
A, B, c3, c4
A, B, c3, c4, c5
A, B, d1, c3, c5
A, B, c3, d3
A, B, c3, d1
A, B, c1, c3, d3
A, B, c2

Among these, particular preference is given to semiaromatic polyesters based on A, B and d1, or A, B and d2, or on A, B, d1 and d2. In another preferred embodiment, the semiaromatic polyesters are based on A, B, c3, c4 and c5 or A, B, d1, c3 and c5.

The semiaromatic polyesters mentioned and the inventive polyester mixtures are generally biodegradable.

For the purposes of the present invention, a substance or a mixture of substances complies with the feature termed "biodegradable" if this substance or the mixture of substances has a percentage degree of biodegradation of at least 60% in at least one of the three processes defined in DIN V 54900-2 (preliminary standard, as at September 1998).

The result of the biodegradability is generally that the polyesters or polyester mixtures break down within an appropriate and demonstrable period. The degradation may be brought about enzymatically, hydrolytically, oxidatively, and/or via exposure to electromagnetic radiation, such as UV radiation, and is mostly predominantly caused by exposure to microorganisms, such as bacteria, yeasts, fungi, and algae. An example of a method of quantifying the biodegradability mixes polyester with compost and stores it for a particular time. By way of example, according to DIN EN 13432 or DIN V 54900-2, Method 3, $CO_2$-free air is passed through ripened compost during the composting process and the compost is subjected to a defined temperature profile. Biodegradability is defined here by way of the ratio of the net amount of $CO_2$ liberated from the specimen (after deducting the amount of $CO_2$ liberated by the compost without the specimen) to the maximum possible amount of $CO_2$ liberated by the specimen (calculated from the carbon content of the specimen), this ratio being defined as the percentage biodegradability. Even after a few days of composting, biodegradable polyesters or biodegradable polyester mixtures generally show marked signs of degradation, for example fungal growth, cracking, and perforation.

Other methods of determining biodegradability are described by way of example in ASTM D5338 and ASTM D6400.

The preparation of the semiaromatic polyesters is known per se or can take place by methods known per se.

The preferred semiaromatic polyesters are characterized by a molar mass ($M_n$) in the range from 1000 to 100 000 g/mol, in particular in the range from 9000 to 75 000 g/mol, preferably in the range from 10 000 to 50 000 g/mol, and by a melting point in the range from 60 to 170° C., preferably in the range from 80 to 150° C.

The semiaromatic polyesters mentioned may have hydroxy and/or carboxy end groups in any desired ratio. The semiaromatic polyesters mentioned may also have been end-group-modified. By way of example, OH end groups may have been acid-modified via reaction with phthalic acid, phthalic anhydride, trimellitic acid, trimellitic anhydride, pyromellitic acid, or pyromellitic anhydride.

Polylactide with the following property profile is preferred as components ii of the biodegradable polyester mixtures:
melt volume rate (MVR for 190° C. and 2.16 kg to ISO 1133) of from 0.5—preferably 2- to 9 ml/10 minutes
melting point below 175° C.
glass transition temperature (Tg) greater than 55° C.
water content smaller than 1000 ppm
residual monomer content (L-lactide) smaller than 0.3%
molecular weight greater than 80 000 daltons.

An example of a preferred component ii is NatureWorks® 4020 or 4042D (polylactide from NatureWorks).

A suitable component iii is a copolymer comprising epoxy groups and based on styrene, acrylates, and/or methacrylates. The units bearing epoxy groups are preferably glycidyl (meth)acrylates. Copolymers which have proven advantageous are those having greater than 20% by weight content of glycidyl methacrylate, particularly preferably greater than 30% by weight, and with particular preference greater than 50% by weight, based on the copolymer, for example those marketed with trademark Joncryl® ADR 4368 from Johnson Polymer. The average molecular weight of the polymers is preferably from 2000 to 20 000, in particular from 4000 to 12 000.

Examples of the additives iv) are
nucleating agents, such as talc, chalk, carbon black, graphite, calcium stearate, zinc stearate, poly-D-lactic acid, N,N'-ethylenebis-12-hydroxystearamide, polyglycolic acid,
lubricants and antiblocking agents,
waxes,
antistatic agents,
further compatibilizers, such as silanes, maleic anhydride, fumaric anhydride, isocyanates, chlorides of diacids,
antifog agents,
UV stabilizers, or
dyes.

These auxiliaries are in particular used at a concentration of from 0.5 to 3% by weight, based on the total weight of components i) and ii).

Addition of nucleating agents is particularly advantageous and has a favorable effect during the production of the foam plies. The finely dispersed nucleating agent provides a surface for cell formation, thus permitting achievement of homogeneous cell structure and control of foam density.

Other materials used as component iv) are preferably epoxy-containing or else unsubstituted natural oils, fatty acid esters, or fatty acid amides, such as erucamide or Merginat® ESBO.

Organic fillers v) that have proven particularly successful are polymers of renewable raw materials, e.g. starch, starch derivatives, cereals, cellulose derivatives, polycaprolactone, and polyhydroxyalkanoates, and in particular here, starch, polyhydroxybutyrate (PHB), polyhydroxybutyrate-co-valerate (PHBV), Biocycle® (polyhydroxybutyrate from PHB Ind.); Enmat® (polyhydroxybutyrate-co-valerate from Tianan).

Inorganic fillers which have proven successful are the following materials previously mentioned as nucleating agents: talc, chalk, carbon black, and graphite. However, they can be used in higher concentrations as filler.

The inventive biodegradable polyester mixtures usually comprise from 5 to 70% by weight, preferably from 10 to 50% by weight, particularly preferably from 10 to 30% by weight, of component i, and from 30 to 95% by weight, preferably from 50 to 90% by weight, particularly preferably from 70 to 90% by weight, of component ii, where the percentages by weight are based in each case on the total weight of components i to ii and give a total of 100% by weight.

The amount used of component iii) is from 0.1 to 5% by weight, preferably from 0.1 to 2% by weight, and particularly preferably from 0.2 to 1% by weight, based on the total weight of components i) to ii).

Known processes can be used to prepare the inventive biodegradable polyester mixtures from the individual components (EP 792 309 and U.S. Pat. No. 5,883,199).

By way of example, all of the components i, ii, and iii can be mixed in one step of a process in mixing apparatuses known to the person skilled in the art, e.g. kneaders or extruders, at elevated temperatures, for example from 120° C. to 250° C., and reacted. The reaction is preferably carried out in the presence of a free-radical generator.

The process described in WO 2006/07815 can also be used to prepare the biodegradable polyester mixtures.

To this end, in a first step, from 1 to 50% by weight, preferably from 5 to 35% by weight, of component iii are mixed with from 50 to 99% by weight, and preferably from 65 to 95% by weight of component i at temperatures of from 110 to 145° C.—preferably from 120 to 140° C.—to give a branching agent masterbatch. At these temperatures, a homogeneous blend is obtained, without any significant molecular weight increase. The resultant branching agent masterbatch can be stored without difficulty at room temperature. In a second step, the desired constitution can be arrived at via addition of the branching agent masterbatch to component ii and, if appropriate, further component i. This compounding step is carried out at from 150 to 250° C.—preferably at from 160 to 190° C.

For production of the extrusion foams, the components are mixed in a single- or twin-screw extruder at from 160 to 220° C. At these temperatures, a homogeneous blend is obtained. It is preferable that PLA (component ii) forms a continuous or cocontinuous phase.

Scanning and transmission electron micrographs show that when a twin-screw extruder is used the discontinuous phase composed of component i forms domains whose diameter is smaller than 150 nm. The result of this is cell walls measuring less than 200 nm, within which there can still be the discontinuous phase dispersed in the matrix. This prevents the cells from breaking open during the expansion procedure. This in turn leads to high contents of closed cells, greater than 70%, in particular greater than 80%, and particularly preferably greater than 90%. The low cell wall thicknesses smaller than 200 nm moreover lead to densities smaller than 50 g/l and preferably smaller than 30 g/l.

From 1 to 25% by weight, preferably from 1 to 15% by weight, of blowing agent is introduced into the melt. Physical blowing agents are used in order to ensure low foam density. Examples of suitable blowing agents are linear alkanes preferably having from 4 to 6 carbon atoms, nitrogen, carbon dioxide, ethanol, dimethyl ether, diethyl ether, methyl ethyl ether, and also combinations thereof. Particular preference is given to butane, pentane, nitrogen, and carbon dioxide, in particular carbon dioxide. The melt is then cooled in a second twin-screw extruder. As an alternative to this, the cooling can be carried out in a downstream segment of the single-screw melting extruder. At the temperatures selected, care has to be taken that the pressure in the extruder is sufficiently high to suppress any potential premature foaming in the extruder. If a perforated die is used, the product is foam strands whose surface is smooth and glossy.

As an alternative to this, annular die geometry can be used in order to obtain tubular foam plies. The extruded tubular foam plies are cooled, for example, with air, and cut open by a knife, and the smooth foam plies thus produced are wound up on a roll. Care has to be taken here that the material is wound-off at constant speed. The wind-off speed can be used to control foam density. Care also has to be taken during extrusion and wind-up that the foam sheets have homogeneous thickness distribution, since this is of decisive importance for the subsequent thermoforming process.

The extruded foam plies can be heated in a thermoforming apparatus via brief and uniform heating, for example by an infrared heating source, to from 80-120° C., particularly preferably from 90-100° C., and thermoformed using vacuum, if appropriate with additional use of compressed air, in a mold to give a defined shape of a foam shell, and can then be air-cooled, for example.

One particular application sector for the biodegradable polyester mixtures with reduced oil absorption and reduced water absorption concerns the use for production of foam plies, for production of foamed packaging, such as thermoformed food- or drinks-packaging.

EXAMPLES

Performance Tests:

Absorption of oil, water, and ethanol was determined as follows:

Defined foam strands of the same diameter were welded end to end, and weighed, and stored for a number of hours at room temperature or at 60° C. in oil and, respectively, water. The relative weight increase of the strands was determined.

The molecular weight $M_n$ of the semiaromatic polyesters was determined as follows:

15 mg of the semiaromatic polyesters were dissolved in 10 ml of hexafluoroisopropanol (HFIP). In each case, 125 µl of this solution were analyzed by gel permeation chromatography (GPC). The measurements were made at room temperature. For elution, use was made of HFIP+0.05% by weight of potassium trifluoroacetate. The elution rate was 0.5 ml/min. The following combination of columns was used here (all of the columns being produced by the company Showa Denko Ltd., Japan): Shodex® HFIP-800P (diameter 8 mm, length 5 cm), Shodex® HFIP-803 (diameter 8 mm, length 30 cm), Shodex® HFIP-803 (diameter 8 mm, length 30 cm). The semiaromatic polyesters were detected by an RI detector (differential refractometry). Narrowly distributed polymethyl methacrylate standards with molecular weights of from $M_n$=505 to $M_n$=2 740 000 were used for calibration. Elution ranges outside this interval were determined by extrapolation.

The melting points of the semiaromatic polyesters were determined by DSC measurements, using Exstar DSC 6200R equipment from the company Seiko:

from 10 to 15 mg of the respective specimens were heated under nitrogen at a heating rate of 20° C./min from –70° C. to 200° C. The melting points given for the specimens were the peak temperatures of the melting peak observed during this test. In each case, an empty specimen crucible was used as reference.

The homogeneity of the mixtures of components i, ii, and iii, and also of the mixtures prepared for comparison, was determined by pressing these mixtures at 190° C., in each case to give foils of thickness 30 µm. The proportion of undispersed component ii present in these foils was assessed visually.

Extrusion using an annular die was used to produce foam plies of thickness from 2 to 3 mm from each of the biodegradable polyester mixtures.

Density was determined by weighing the foam specimen and determining the displacement volume in water.

For determination of closed-cell content, a cross section of the foam strand or of the foam ply was analyzed by electron microscopy. Taking a rectangular section, the cell content comprising closed cell wall structure was determined.

Cell wall thickness and the morphology were determined by means of transmission electron microscopy and scanning electron microscopy.

Starting Materials:
Component i:
i-1: To prepare the polyester i-1, 87.3 kg of dimethyl terephthalate, 80.3 kg of adipic acid, 117 kg of 1,4-butanediol, and 0.2 kg of glycerol were mixed with 0.028 kg of tetrabutyl orthotitanate (TBOT), the molar ratio between alcohol components and acid component being 1.30. The reaction mixture was heated to a temperature of 180° C. and reacted for 6 h at this temperature. The temperature was then increased to 240° C., and the excess dihydroxy compound was removed by distillation in vacuo over a period of 3 h. 0.9 kg of hexamethylene diisocyanate was then slowly metered in at 240° C. within a period of 1 h.

The resultant polyester i-1 had a melting point of 119° C. and a molar mass ($M_n$) of 23 000 g/mol (corresponds to Ecoflex® FBX 7011, produced by BASF Aktiengesellschaft).

Component ii:
ii-1: aliphatic polyester, Natureworks® 4042 D polylactide from NatureWorks.
Component iii:
iii-1: Joncryl® ADR 4368 from Johnson Polymer.
Further Components:
Nucleating Agents: Talc, Chalk In each case a perforated die was used in order to obtain foam strands.

Examples 1 to 4

| Example | Component i | Component ii | Component iii | Additive | Blowing agent |
|---|---|---|---|---|---|
| Ex. 1 | 19% by wt. of (Ecoflex® FBX 7011) | 80% by wt. of PLA 4042D | 0% by wt. of Joncryl 4368 | 1% by wt. of CaCO$_3$ | 10% by wt. of CO$_2$ |

-continued

| | | | | | |
|---|---|---|---|---|---|
| Ex. 2 | 18.8% by wt. of (Ecoflex ® FBX 7011) | 80% by wt. of PLA 4042D | 0.2% by wt. of Joncryl 4368 | 1% by wt. of $CaCO_3$ | 10% by wt. of $CO_2$ |

| Example | Density g/l | Closed-cell content | Cell wall thickness in nm | Appearance |
|---|---|---|---|---|
| Ex. 1 | 27 | >80 | <200 nm | Smooth glossy surface, good feel |
| Ex. 2 | 34 | >90 | <180 nm | Smooth glossy surface, good feel |

Example 2 shows that use of the compatibilizer can further raise closed-cell content when comparison is made with Example 1, which itself is very good.

Water Absorption:

| Example | Temperature/° C. | Rel. absorption after 4 h in % |
|---|---|---|
| Ex. 1 | 23 | 43 |
| Ex. 1 | 60 | 129 |
| Ex. 2 | 23 | 1 |
| Ex. 2 | 60 | 12 |

Olive Oil Absorption:

| Example | Temperature/° C. | Rel. absorption after 4 h in % |
|---|---|---|
| Ex. 1 | 23 | 111 |
| Ex. 1 | 60 | 82 |
| Ex. 2 | 23 | 16 |
| Ex. 2 | 60 | 16 |

Ethanol Absorption:

| Example | Temperature/° C. | Rel. absorption after 4 h in % |
|---|---|---|
| Ex. 1 | 23 | 147 |
| Ex. 1 | 60 | 429 |
| Ex. 2 | 23 | 38 |
| Ex. 2 | 60 | 189 |

Example 2 provides impressive evidence that water absorption and oil absorption can be reduced dramatically via the inventive compatibilizer.

The invention claimed is:

1. A foam ply based on a biodegradable polyester mixture, comprising
   i) from 70 to 5% by weight, based on the total weight of components i) to ii), of at least one polyester based on aliphatic and aromatic dicarboxylic acids and on aliphatic dihydroxy compounds, and
   from 30 to 95% by weight, based on the total weight of components i) to ii), of polylactide, and
   iii) from 0.1 to 5% by weight, based on the total weight of components i) to ii), of a copolymer which comprises epoxy groups and is based on styrene, acrylates, and/or methacrylates, wherein the content of said epoxy groups in said copolymer is more than 30%, and
   iv) from 0.5 to 3% by weight, based on the total weight of components i) to ii), of a nucleating agent, and
   v) from 0 to 50% by weight of inorganic or organic filler.

2. The foam ply according to claim 1, where component i) is composed of:
   A) an acid component composed of
      a1) from 30 to 99 mol % of at least one aliphatic, or at least one cycloaliphatic, dicarboxylic acid, or its ester-forming derivatives, or a mixture of these
      a2) from 1 to 70 mol % of at least one aromatic dicarboxylic acid, or its ester-forming derivative, or a mixture of these, and
      a3) from 0 to 5 mol % of a compound comprising sulfonate groups,
   where the molar percentages of components a1) to a3) together give 100%, and
   B) a diol component composed of at least one $C_2$-$C_{12}$ alkanediol or one $C_5$-$C_{10}$ cycloalkanediol, or a mixture of these,
   and
   D) a component selected from
      d1) at least one compound having at least three groups capable of ester formation,
      d2) at least one isocyanate,
      d3) at least one divinyl ether,
      or a mixture composed of d1) to d3).

3. The foam ply according to claim 2, where, in component i),
   the aliphatic or cycloaliphatic dicarboxylic acid (component a1)) is succinic acid, adipic acid, or sebacic acid, ester-forming derivatives thereof, or a mixture of these;
   the aromatic dicarboxylic acid (component a2)) is terephthalic acid or ester-forming derivatives thereof, and
   the diol component (component B) is 1,4-butanediol or 1,3-propanediol.

4. The foam ply according to claim 1, where component ii) is a polylactide whose melt volume rate (MVR for 190° C. and 2.16 kg to ISO 1133) is from 2 to 9 ml/10 minutes.

5. The foam ply according to claim 1 whose density is smaller than 50 g/l.

6. The foam ply according to claim 1 whose content of closed cells is greater than 70%.

7. The foam ply according to claim 1 whose maximum water absorption for 23° C. and 4 hours is smaller than 10% by weight.

8. The foam ply according to claim 1 comprising
   from 10 to 30% by weight of component i), and
   from 70 to 90% by weight of component ii),
   based in each case on the total weight of components i) to ii).

9. The foam ply according to claim 1, where component ii) forms a continuous or cocontinuous phase.

10. The foam ply according to claim 1 having a layer thickness of from 0.5 to 100 cm.

11. The foam ply according to claim 1, comprising from 0.1 to 2% by weight of component iii), based on the total weight of components i) to ii).

12. The foam ply according to claim 1, comprising, as filler v), from 5 to 50% by weight, based on components i) and ii), of a renewable polymer.

* * * * *

UNITED STATES PATENT AND TRADEMARK OFFICE
CERTIFICATE OF CORRECTION

PATENT NO. : 8,455,560 B2  
APPLICATION NO. : 12/526807  
DATED : June 4, 2013  
INVENTOR(S) : Dietrich et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 962 days.

Signed and Sealed this
Eighth Day of September, 2015

Michelle K. Lee
*Director of the United States Patent and Trademark Office*